Patented Aug. 14, 1928.

1,680,860

UNITED STATES PATENT OFFICE.

FRANK KERR CHISHOLM, OF GOULBURN, AUSTRALIA.

TOBACCO SUBSTITUTE WITH THERAPEUTICAL PROPERTIES.

No Drawing. Application filed December 2, 1926, Serial No. 152,311, and in Australia January 18, 1926.

This invention consists in a new manufacture having therapeutical properties, and usable in the same way as smoking tobacco in pipes or in the form of cigarettes. It consists in a product prepared according to the hereinafter described method from plants of the *Myrtaceæ* in which a notable proportion of eucalyptol and/or piperotone is contained. The leaves of any of the numerous members of the *eucalypt* species in which eucalyptol and/or piperotone are contained are usable as the raw material for the product. The aroma and the therapeutical value vary according to the characteristics of the particular member which is used. Thus, a delicate aroma combined with a high therapeutical value is obtained in a product manufactured from "*Eucalyptus citriodora*", whilst "*E. dives*" produces a heavier tasting and stronger smelling product also having notable therapeutical value. The selection of the raw material best appropriate for a particular demand depends upon the aroma and taste which appeals to the desires of the intending user. In practice, the varieties which are of best utility are *E. citriodora*, *E. dives*, *E. phellandra*, *E. Australiana*, *E. globulus*, and *E. polybractea*.

This product has displayed marked therapeutical value when smoked by persons affected by catarrh and certain affections of the respiratory organs.

The process of manufacture of this product is as follows:—

The leaves of the selected eucalypt are taken fresh from the tree; adherent stems and woody matter and withered leaves and leaves which have been mutilated by insects and leaves which carry parasitic growths are separated out as waste; and the selected leaves are air dried or are dried by artificial heat, the drying being terminated before the stage is reached at which the leaves would become too friable to survive the subsequent operations on them. The leaves of distinct species may be utilized separately, or the leaves from two or more varieties of eucalypts may be mixed in any desired proportion determined by their respective aromas, having regard to the particular character of final product to be obtained. Thus, the various varieties of *E. dives* may be mixed indifferently, or the mix may contain leaves of such species as *E. phellandra*, *E. citriodora*, and *E. globulus*. The leaves must be kept free from access of rain during the drying stage.

The dried leaves are passed between heavy rolls and crushed sufficiently to burst open the cells; and they are then macerated in a weak aqueous solution of glycerine and nitre ("salt-petre") for a period of 3 hours more or less. Only enough liquor is used to effect maceration, and drained off liquor is reused for macerating further batches. The glycerine which is absorbed into the leaves functions as a hydroscopic agent which prevents drying out of the end product, and the saltpetre which is absorbed augments flagration of the end product so that it is made usable for cigarettes and for pipe smoking purposes. After maceration, the leaves are drained and placed in a pressure tight vessel and heated therein to bring up the temperature to a point not in excess of 200° F. or thereabouts. 100° F. may be regarded as a low temperature limit. The period of heat treatment is about three hours, more or less, and it is advantageous to move the leaves during the heating operation. A little molasses or honey may be used in the macerating solution in addition to or as substitute for part of the glycerine. The proportion of glycerine should be about 1 lb. per gallon of water, and of salt-petre 1 lb. per gallon of water, more or less.

After treatment with liquor (and heat) a mass of the leaves is packed in a mould and compressed. Large sound leaves should be disposed on the outer part of the mass to better ensure compactness of the pressed block. The leaves adhere sufficiently to remain in cake or block form almost indefinitely after removal from the press. The desirable pressure is in excess of two tons on the square inch; the pressure is maintained for an hour or more, and the moulds are heated, but not above 212° F. A sufficiently high temperature to boil off the moisture so as to overdry the product is objectionable. After removal from the press, the cakes or blocks are aged to cure in boxes or other protective containers for a period of several weeks. They may then be cut to form pipe filling or cigarette filling pieces or shreds, similar to tobacco. For cigarette fillings it is not essential to first press the leaves into blocks or cakes, but curing is essential.

In the pressing operation it is found sometimes that some liquor is squeezed out. This liquor is collected and is added to the macerating liquor in which other batches of leaves which are less rich in expressible matter are being treated.

More or less cured tobacco leaf may be intermixed with the eucalypt leaves and pressed with them in order to obtain a mixed product, the aroma and smoking qualities of which will be acceptable to habitual tobacco smokers.

What I claim as my invention and desire to secure by Letters Patent is:—

1. The manufacture of a tobacco substitute with therapeutical properties which consists in semi-drying natural eucalyptus leaves, bursting the cell structure of the leaves by rolling, macerating them in an aqueous solution containing about 10% of an hygroscopic substance and 10% of a flagrating substance, submitting them to heat within a temperature range of 100° F.—200° F. for a period of approximately three hours, subjecting them to pressure of the order of two tons per square inch in a compacted mass in moulds heated to a point not above 212° F. and curing the pressed mass by ageing.

2. The manufacture of a tobacco substitute with therapeutical properties according to claim 1, wherein expressed liquor obtained from one batch of the product is introduced into another batch thereof.

3. The manufacture of a tobacco substitute with therapeutical properties according to claim 1, wherein the product is pressed into cakes or blocks and cured by ageing under cover.

In testimony whereof I affix my signature.

FRANK KERR CHISHOLM.